US008896466B2

(12) United States Patent
Georges et al.

(10) Patent No.: US 8,896,466 B2
(45) Date of Patent: Nov. 25, 2014

(54) METHOD OF DISPLAYING AN IMAGE ON A SCREEN OF AN AIRCRAFT

(75) Inventors: Laurent Georges, Pinsaguel (FR); Remi Cabaret De Alberti, Toulouse (FR); Laetitia Lambinet, Colomiers (FR); Laurent Brunet, Leguevin (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 786 days.

(21) Appl. No.: 12/837,743

(22) Filed: Jul. 16, 2010

(65) Prior Publication Data
US 2011/0018742 A1 Jan. 27, 2011

(30) Foreign Application Priority Data

Jul. 23, 2009 (FR) ...................................... 09 55167

(51) Int. Cl.
| *G01C 21/00* | (2006.01) |
| *G06F 3/147* | (2006.01) |
| *G09G 5/10* | (2006.01) |
| *G09G 5/30* | (2006.01) |
| *G08B 23/00* | (2006.01) |
| *G08G 1/123* | (2006.01) |
| *G06F 3/00* | (2006.01) |
| *G09G 5/02* | (2006.01) |
| *G06T 15/00* | (2011.01) |

(52) U.S. Cl.
CPC *G06F 3/147* (2013.01); *G09G 5/10* (2013.01); *G09G 5/30* (2013.01); *G09G 2340/10* (2013.01); *G09G 2340/125* (2013.01); *G09G 2380/12* (2013.01)
USPC ...... 340/971; 340/963; 340/995.19; 340/972; 715/700; 345/592; 345/419

(58) Field of Classification Search
USPC ................ 340/971, 963, 995.19, 972; 83/971
See application file for complete search history.

(56) References Cited

U.S. PATENT DOCUMENTS

| 2002/0149599 | A1* | 10/2002 | Dwyer et al. .................. 345/592 |
| 2002/0167535 | A1* | 11/2002 | Matsumoto .................... 345/629 |
| 2005/0066275 | A1* | 3/2005 | Gannon ......................... 715/700 |
| 2006/0227014 | A1* | 10/2006 | Gannon ......................... 340/972 |
| 2009/0309812 | A1* | 12/2009 | Larson et al. ...................... 345/8 |
| 2010/0052949 | A1* | 3/2010 | Suddreth et al. .......... 340/995.19 |
| 2010/0085440 | A1* | 4/2010 | Fujita et al. ................. 348/222.1 |

FOREIGN PATENT DOCUMENTS

| EP | 1 783 725 A2 | 5/2007 |
| WO | WO 98/29831 A1 | 7/1998 |

OTHER PUBLICATIONS

French Search Report issued in French Patent Application No. 0955167, dated Jan. 7, 2010 (with English translation).

* cited by examiner

*Primary Examiner* — Jack K Wang
(74) *Attorney, Agent, or Firm* — Oliff PLC

(57) ABSTRACT

In one aspect of the method for displaying an image on a screen of a cockpit of an aircraft, control means:
  control a first display on the screen of an image comprising a background; and then
  control a second display so that, in at least one zone of the image that is determined independently of the background, the background presents a non-zero second mean luminance that is less than a first mean luminance that it presented during the first display.

In another aspect, the control means control the display on the screen of an image comprising a background in such a manner, that at least in a zone of the image that is determined independently of the background, the background presents non-zero mean luminance that is less than mean luminance of the remainder of the background.

10 Claims, 2 Drawing Sheets

METHOD OF DISPLAYING AN IMAGE ON A SCREEN OF AN AIRCRAFT

The invention relates to aircraft, and in particular to displaying images and data on a screen of an aircraft cockpit.

BACKGROUND OF THE INVENTION

It is known to provide multifunction liquid crystal screens in the visual display systems of aircraft cockpits, where such screens are capable of displaying a large amount of information simultaneously. The information may have a variety of presentations:

- text and simple crosshairs generated by the display unit;
- a bitmap type colored background provided by a system external to the visual display system; and
- a complex video image also provided by an external system.

In order to optimize graphics processing and to guarantee correct priority levels for the symbology generated by the visual display system, it is known that the graphics memory that defines the content of the digital image for display on the matrix of the screen may be organized as a plurality of graphics planes, specifically:

- a symbology plane;
- a matrix or bitmap plane; and
- a video plane.

Under such circumstances, it is possible to display on the screen an image that presents a background of strong graphic density having signs associated with some particular symbology superposed thereon. By way of example, the background may be a map, a radar image, information provided by a database relating to terrain, or indeed a satellite image. The function of the background is to improve the aircraft pilot's perception of the surroundings outside the aircraft. Nevertheless, it does not constitute primary means for guaranteeing flight integrity.

The symbology may be associated with information relating to a variety of domains such as the flight plan, radio-navigation, managing on-board systems, sending messages or alarms, or indeed elements concerning monitoring the surrounding air space. Such elements may for example relate to traffic alert and collision avoidance systems (TCAS).

This information is generally more critical than the background image, and in any event of higher priority for flight integrity. That is why the way in which the graphics planes are organized ensures that the symbology is always drawn so as to be visible in front of the background image, i.e. on top of it.

Nevertheless, that does not suffice to ensure that the symbology is clearly legible under all circumstances, in particular if the background is moving or cluttered with numerous graphics elements of different colors.

Unlike raster-scanning cathode ray screens where superposing signs has the result of increasing the light intensity of each pixel, thereby ensuring satisfactory contrast in all circumstances, with matrix type screens such as liquid crystal screens, such superposition involves a priority order. Thus, at each pixel of the image, only the element corresponding to the graphics plane having the highest priority is displayed. In other words, only the color (and consequently the luminance) of the sign having the highest priority is displayed amongst signs that are superposed.

Under such conditions, since liquid crystal screens are nowadays greatly preferred over raster-scanning cathode ray screens, it is important to make priority information clearly visible on the image.

One known solution for improving the legibility of the symbology on the background is haloing. That consists in emphasizing the outline of the priority item (e.g. a character or crosshairs) by a black line that artificially increases the contrast between the item and the background that surrounds it. Nevertheless, that technique is effective above all when the signs are on a colored background that is relatively uniform or when the sign forms solid crosshairs. It is found to be much less effective with characters, or thin traces that are displayed on a background presenting high resolution.

OBJECT AND SUMMARY OF THE INVENTION

An object of the invention is thus to improve the display of important information on an aircraft screen that takes priority of items of information into account relative to one another.

For this purpose, the invention provides a method of displaying an image on a screen of an aircraft cockpit, in which control means:

- control a first display on the screen of an image comprising a background; and then
- control a second display so that, in at least one zone of the image that is determined independently of the background, the background presents a non-zero second mean luminance that is less than a first mean luminance that it presented during the first display.

The change in luminance prepares the image and the observer for displaying a sign in the zone under consideration. The sign may also be displayed during the second display step, at the same time as the second mean luminance appears. Thus, in the zone, it is possible to display a sign independently of the background so that the sign stands out from the background with good contrast to ensure good legibility. For example, in certain zones of the screen, the invention may amount to interposing an intermediate layer between the background graphics plane and the graphics plane for signs that are distinct from the background, which intermediate layer is semi-transparent, attenuating the luminance of the background in the zone. Its purpose is to attenuate the mean luminance of the background so as to improve the contrast of the sign present in the zone, while nevertheless ensuring a certain amount of legibility for the background in that zone. The image thus appears as though it has a background, but with data that is visible in front of the background and a semi-transparent intermediate veil or layer interposed between the data and the background.

It should be observed that the method may be implemented in such a manner that the control means:

- control the display of the image in such a manner that throughout the image the background presents the first mean luminance; and then
- control the display of the image in such a manner that, once more throughout the image, the background presents a non-zero second mean luminance that is less than the first luminance.

This corresponds to a situation in which the entire background image is shaded.

Advantageously, at least in the zone, the display means control the display of at least one sign that is distinct from the background, preferably in such a manner as to present mean luminance that is greater than the second luminance, at least in the zone.

Advantageously, the display means control the display of the sign so that it presents mean luminance greater than a mean luminance of another sign in the zone and distinct from the background.

Thus, the image appears as though the semi-transparent layer also covers some of the signs of the zone but not all of them. This may serve to make certain signs visible and legible to a greater or lesser extent in order to reveal a priority order amongst them.

Advantageously, the control means control the display of the sign in such a manner that it presents mean luminance less than mean luminance of another sign of the image lying outside the zone.

In an embodiment, the control means leave switched off at least one predetermined pixel of a pattern in each occurrence of the pattern that is repeated to form the background at least throughout the zone.

Thus, the graphics processing of the zone for displaying the background is reduced to a minimum and makes use of few computer resources. This method enables the luminance of the zone in question to be reduced very simply, thereby increasing the contrast of the symbology overlying the background in said zone. It does not introduce any colorimetric distortion. If the background is absent from the image, then the pattern as such does not appear. Finally, this method enables resolution to be obtained that is sufficiently fine not to disturb reading of the image.

Preferably, the control means preferably leave switched off at least two pixels of the pattern.

Also preferably, the pattern comprises four pixels arranged in a square, and the control means cause two pixels situated in two opposite corners of the square to be left switched off.

In an embodiment, the zone does not include any sign in addition to the background.

Advantageously, the or each zone lies at the periphery and/or at the center of the image.

Advantageously, the background occupies the major fraction of the surface area of the image.

Preferably, the background extends to each edge of the image.

Advantageously, the screen is a matrix screen.

The invention also provides a device for controlling the display of an image on a screen in an aircraft cockpit, the device being suitable for:
controlling a first display on the screen of an image comprising a background; and then
controlling a second display so that, in at least one zone of the image that is determined independently of the background, the background presents a non-zero second mean luminance that is less than a first mean luminance that it presented during the first display.

Preferably, the device comprises at least one graphic memory having the following graphics layers:
a layer forming the background of the image;
an intermediate layer suitable for attenuating the mean luminance of the background at least in the zone; and
a layer forming at least one sign.

The invention also provides a method of displaying an image on a screen of a cockpit of an aircraft, wherein the control means control the display on the screen of an image comprising a background in such a manner, that at least in a zone of the image that is determined independently of the background, the background presents non-zero mean luminance that is less than mean luminance of the remainder of the background.

Thus, whereas in the first aspect of the invention, the luminance of at least one point is varied in time by comparing two steps of displaying the image or two representations of the image, here the distinction is made in space by distinguishing one zone of the background from the remainder of the background. Once more, good contrast is obtained between the sign and the background visible behind it in the zone in a manner that is simple.

The invention also provides a device for controlling the display of an image on a screen of an aircraft cockpit, the device being suitable for controlling the display on the screen of an image comprising a background in such a manner, that at least in a zone of the image that is determined independently of the background, the background presents non-zero mean luminance that is less than mean luminance of the remainder of the background.

The invention also provides an image displayed on a screen of an aircraft cockpit, the image comprising a background and presenting at least one zone that is determined independently from the background, in which the background has non-zero mean luminance that is less than mean luminance of the remainder of the background.

The image also provides a signal for an aircraft cockpit, the signal representing an image of the invention and being suitable for causing it to be displayed on a screen of the cockpit of the aircraft.

Finally, the invention provides a computer program including code instructions suitable for controlling the execution of a method according to either of the aspects of the invention when it is executed on a computer.

BRIEF DESCRIPTION OF THE DRAWINGS

Other characteristics and advantages of the invention appear further from the following description of an embodiment given by way of non-limiting example and with reference to the accompanying drawings, in which.

MORE DETAILED DESCRIPTION

Figure 1:
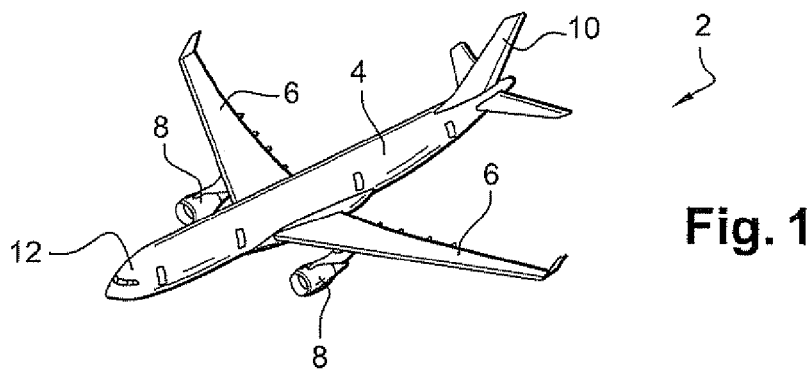
FIG. 1 is a perspective view of an airplane having the invention implemented on board.

FIG. 1 shows an aircraft 2 having the method of the invention implemented on board. The aircraft shown is specifically an aerodyne, here an airplane comprising a fuselage 4, two wings 6, two engines 8 carried by respective ones of the wings, and a tail 10. At the front of the fuselage, the airplane has a cockpit 12 occupied by one or more pilots.

The cockpit includes one or more (visual) display systems. The description below relates to one such display system 14. The system comprises a computer 16 and a screen 18 connected to the computer. Specifically the screen is a matrix screen, e.g. a liquid crystal screen. Unlike the screen 18, it is entirely possible for the computer 16 to be located outside the cockpit.

The system 14 is connected by on-board telecommunications means 20 to other on-board systems 22, 24, and 26, each including at least one computer. These systems 22 to 26 may relate to functions as varied as mapping, radar imaging, a terrain database, satellite imaging, the flight plan, radio-navigation, managing on-board systems, managing messages and alarms, or indeed monitoring the surrounding air space.

The computer 16 includes one or more memories and at least one microprocessor. The function of the system 14 is to deliver an image 30 on the screen 18 to provide the pilot with data and/or information relating to the flight, to the aircraft, and to its surroundings. The image in this example is of rectangular shape so that it has four rectilinear edges, respectively top, bottom, left, and right edges. The computer 16 forms control means suitable for controlling the implementation of the steps of the method of the invention as described below. These means serve in particular to cause the image 30 to be displayed on the screen 18.

The image 30 includes a background 32. By way of example, the background may be a map, a radar image, a representation of terrain taken from a database, or indeed a satellite image. It may be a video image. The background extends to each of the four edges of the image 30. The background forms the portion of the image that gives the impression of being visible behind the image.

Figure 2:
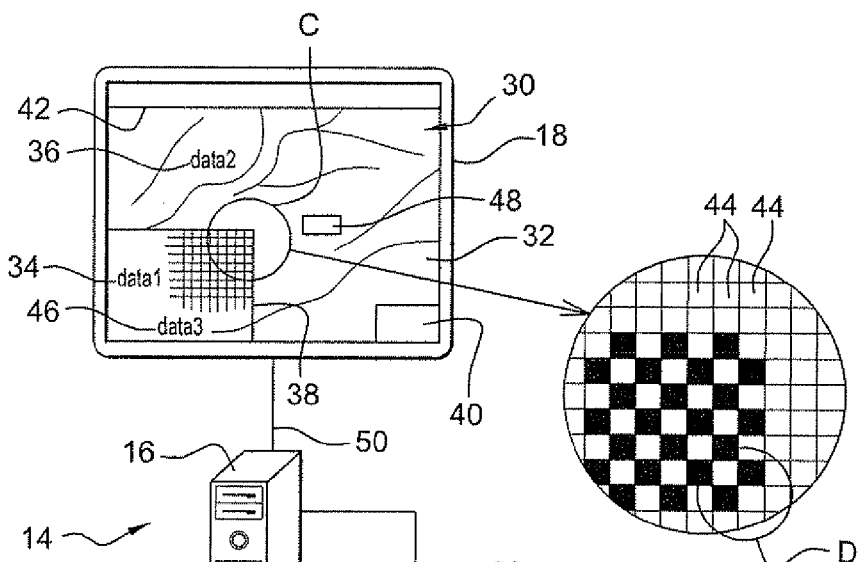
FIG. 2 is a diagram of a device of the invention as present on board the FIG. 1 airplane.

The image comprises signs that are distinct from the background and that appear to be in front of it, i.e. above it. The background is contiguous with the signs. In FIG. 2, there can thus be seen signs 34 reading "data 1", 36 "data 2", and 46 "data 3". These signs may generally be constituted by letters, words, symbols, or indeed drawings or marker lines. In spite of the presence of these signs, the background occupies the major fraction of the total area of the image.

The computer 16 determines one or more zones 38, 40, 42, and 48 on the image 30. These zones are determined independently of the background, i.e. independently of the information content of the background. This determination may be identical under all circumstances. Alternatively, it may be adapted as a function of circumstances. The zones 38 to 40 occupy the bottom left and right corners of the image. The zone 42 forms a top strip. The zone 48 extends in the central portion of the image. The zones are rectangular in shape in this example.

The signs 34 "data 1" and 46 "data 3" lie in the zone 38. The sign 36 "data 2" lies outside the above-mentioned zones. The zones 40, 42, and 48 do not include any signs in addition to the background.

In each of these zones, the control means 16 cause the display to operate in such a manner that the background 32 presents non-zero mean luminance that is less than the mean luminance of the remainder of the background. Specifically, the remainder of the background is constituted by all portions of the image with the exception of the signs 34, 36, and 46, and of the zones 38, 40, 42, and 48.

Figure 3:
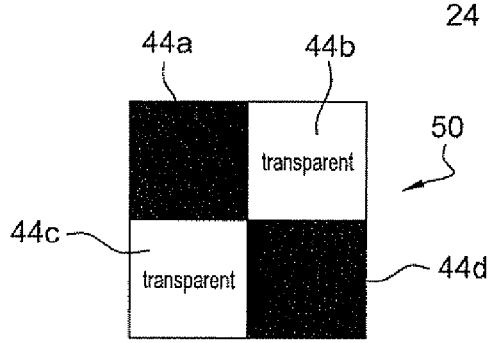
FIG. 3 is a larger-scale view of a detail of FIG. 2.

Specifically, the luminance difference is implemented as follows. FIG. 2 shows a detail C as visible on the screen, but to a larger scale, and FIG. 3 shows an enlargement of a detail D of the detail C. Since the image 30 is a matrix image, it is formed of elements 44 known as pixels, that are arranged in an array and that form a table of rows and columns. Each of the pixels may be activated to deliver light with a certain luminance and a certain chrominance. Each of the pixels of the screen is thus controlled individually to display a portion of the image.

In the zone 38, a pattern 50 is defined that repeats to form the entire zone. Specifically, the pattern is a rectangular pattern that is square as shown in FIG. 3. This pattern 50 comprises four adjacent pixels arranged in a square. The entire zone 38 is thus represented by repeating this pattern in the horizontal and vertical directions.

In the zone 38, in order to display the background 32, in each occurrence of the pattern, at least one same predetermined pixel of the pattern is left switched off, and in the example shown two predetermined pixels 44a and 44d are left off, i.e. the top left and bottom right pixels in the pattern, as shown in FIG. 3. The luminance of each of these pixels is therefore zero and they appear black. Thus, in the zone 38, only one pixel in two is switched on for displaying the background. The other two pixels 44b and 44c receive luminance and chrominance commands that are identical to those they would have received if the background were being displayed normally in the absence of the zone 38. Given that only one pixel in two is on in this example, the mean luminance of the background in the zone 38 is divided by two compared with the mean luminance in the portion of the background that lies outside the zones 38, 40, 42, and 48.

Figure 4:
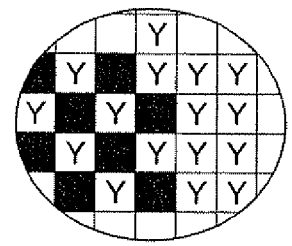
FIG. 4 is a view analogous to FIG. 3, showing the detail of an image.

FIG. 4 thus shows the situation where it is desired to give the background a yellow color in the detail C that covers a portion of the zone 38 and a portion of the background that lies outside the zones 38, 40, 42, and 48. The pixels 44 that lie outside the zone 38 all receive a chrominance command that corresponds to the yellow color and a normal luminance command. In contrast, in the zone 38, only one pixel in two receives such a command with the other pixels being kept off so that their luminance is zero.

As can be seen in FIG. 2, in the present example, one of the signs, the sign 34, lies in the zone 38 of the image, while another sign, the sign 36, lies in a portion of the image that is not occupied by the above-mentioned zones. The sign 34 is distinct from the background 32. The control means cause the sign 34 to be displayed in such a manner as to present mean luminance that is greater than the mean luminance of the background in the zone 38 and identical to the mean luminance of the sign 36 that lies outside the zones 38, 40, 42, and 48. Specifically, the sign 34 "data 1" receives a normal display command and thus presents good display contrast relative to the background of attenuated luminance in the zone 38.

Different signs may be displayed in a given zone, and by way of example the signs 34 "data 1" and 46 "data 3" are both displayed in the zone 38. They can then be displayed in such a manner that they present the same mean luminance, this mean luminance also being identical to the mean luminance of the sign 36 that is situated outside the zones 38, 40, 42, and 48. Alternatively, the display may be controlled in such a manner that the sign 46 presents, for example, mean luminance that is less than the mean luminance of the sign 34 or of the sign 36. This may be done for example merely by applying the same method using the above-mentioned pattern, switching on only one pixel in two of the pixels associated with the sign 46.

The control means 16 are arranged to generate a signal representative of the image 30 in order to display it on the screen 18. This signal passes via a cord 50 connecting the computer 16 to the screen.

In another aspect of the invention, it may be considered that one of the zones 38, 40, 42, and 48, e.g. the zone 38, is initially absent when the image 30 is displayed for the first time on the screen 18. The background 32 will therefore be displayed with attenuated mean luminance only in the zones 40, 42, and 48, with the background in all other locations being displayed normally with a first luminance, ignoring the presence of the signs.

In a subsequent step, the control means 16 send a new version of the image 30 to the screen 18, this new version having the zone 38. Under such circumstances, in the new version of the image, the background presents a second mean luminance that is less than the first luminance that it previously presented at the same location in the image at the preceding step prior to said zone appearing on the screen. In a third step, the display of this zone may precede the display of the data, e.g. the data 34 and 46 in the zone 38. Alternatively, it make take place simultaneously with the appearance of said data in the zone. It is thus possible either to provide for the intermediate transparent layers to be displayed permanently, or else to constrain the presence thereof to the presence of signs, e.g. texts that they are to show up.

To implement the method, the graphics memory of the computer 16 is organized so that it has the following distinct superposed graphics planes or layers:
- a layer forming the background 32 of the image;
- an intermediate layer suitable for attenuating the mean luminance of the background in the zones 38, 40, 42, and 48 by using the above-mentioned pattern; and
- a layer that serves at least to form the signs 34, 46.

The method of the invention may be implemented by means of a computer program stored in the computer 16 and including lines of code suitable for controlling the implementation of the steps of the method when executed on a computer. The program may be recorded on a fixed or removable data recording medium. Provision may be made for the program to be made available on a telecommunications network for downloading.

The invention, which makes it possible to introduce a semi-transparent intermediate layer between the symbology and the background of the image and serves here to manage the semi-transparency by means of a specific raster pattern, thus provides a good compromise between showing up priority information and the observer continuing to perceive the elements of the image background. The invention is compatible with extending the image and its background over the entire screen. The invention makes it unnecessary to provide opaque masks that are applied to the image in order to make the signs readable, which opaque masks would serve to avoid the background of the image interfering with the symbology, but would deprive the pilot of a portion of the background. The invention thus serves to improve the pilot's perception of the surroundings. The invention is very flexible in its implementation. It is thus possible to choose freely the zone(s) of the image that is/are concerned, the display conditions in such a zone, and the color(s) associated with such a zone.

It can be understood that the invention also makes it possible to provide different semi-transparent layers interposed between different levels of symbology in order to increase discrimination and enhance the observer's perception of priorities. Thus, three or more symbols in a given zone may have mutually different mean luminances. For example, the decreasing priority levels of different signs may be displayed with patterns in which, respectively:
- none of the pixels 44 is off;
- one in four of the pixels is off;
- two of the pixels are off; and
- three of the pixels are off.

Preferably, only certain portions of the image implement the method of the invention so as to reduce the additional graphics load the invention generates in terms of image production.

Figure 5:
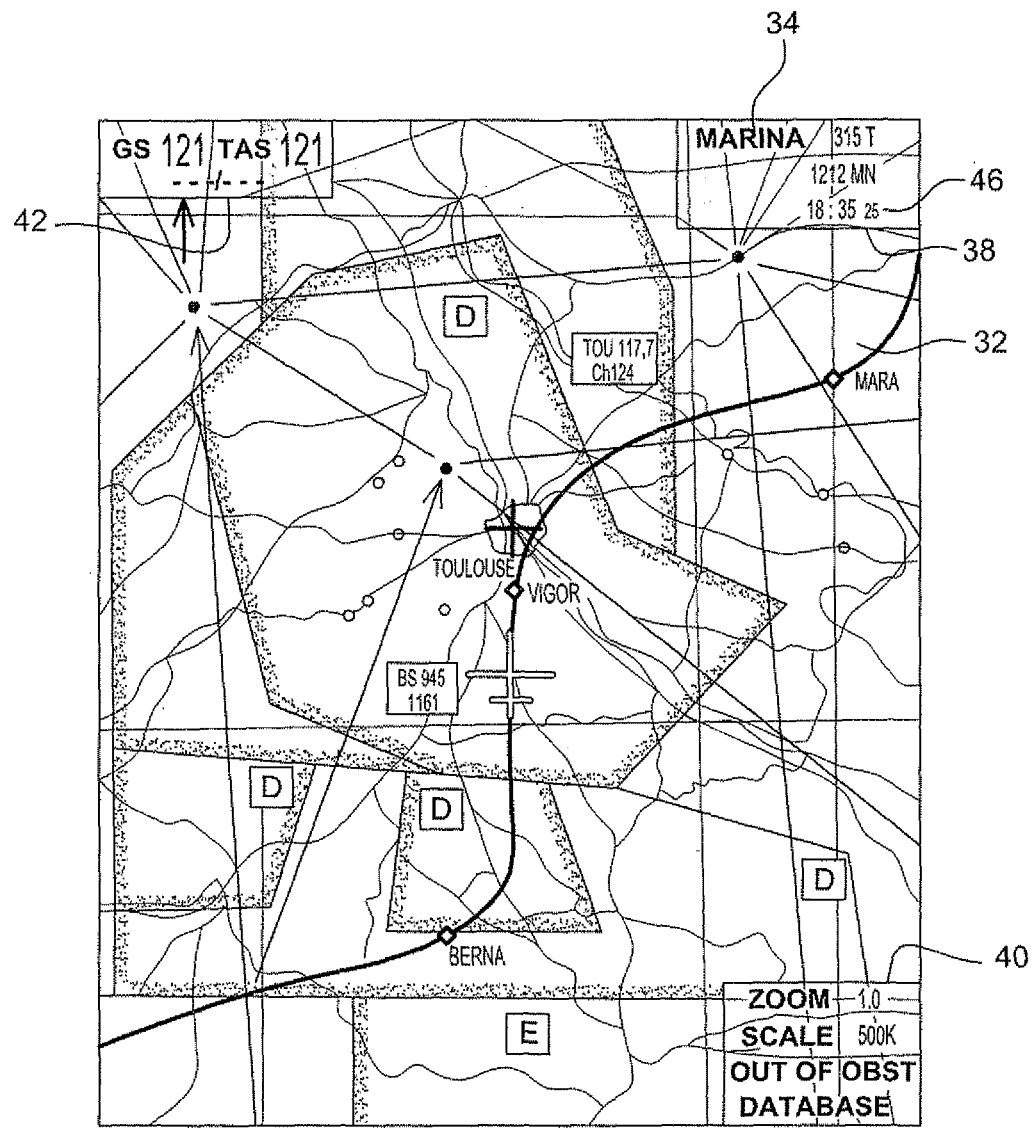
FIG. 5 shows an example of an image displayed by the screen of the FIG. 2 device.

FIG. 5 shows a detailed example of an image displayed using the screen 18. A rectangular zone 38 situated in the top right corner of the screen presents reduced luminance and provides a multicolor background presenting a grayed or shaded terrain map on which the signs 34 "MARINA" in green and the sign 46 "18:35" in white stand out in particular. The image presents two other similar rectangular zones 40 and 42 situated respectively in the bottom right corner and in the top left corner. Apart from these three zones where the background luminance is reduced, in the remainder of the image the background presents normal luminance. The three zones and the remainder include signs that stand out from the background by having luminance that is not reduced. Provision may be made for a large top zone of the image to present luminance that is slightly reduced and for two strip-forming zones, one at the top and one at the bottom, to have even lower luminance. In a variant, it is possible to provide an image with only the two zones of attenuated luminance forming top and bottom strips.

The image may be in color or in black and white.

Naturally, numerous modifications may be made to the invention without going beyond the ambit thereof.

Provision may be made, independently of the invention, to use a method of displaying an image that includes signs, a background visible behind the signs, and a semi-transparent layer covering part of the background behind the signs.

Provision may be made to reduce the luminance of the background in the zones 38, 40, 42, and 48 without implementing a pattern.

If a pattern is used for this purpose, it may be a pattern that is different from that shown in FIG. 3. For example, provision may be made for a pattern forming a 3×3 matrix in which only the pixels of one diagonal are off or indeed in which only one pixel is off, or on the contrary only the central pixel of the pattern is on. In a square pattern such as that shown in FIG. 3, provision may be made for only the top left pixel or the bottom right pixel to be switched on, for example.

Although the invention is particularly advantageous when it is implemented by means of a matrix screen, it is not restricted to this type of screen and it may be used on a raster-scan screen.

What is claimed is:

1. A method of displaying an image on a screen in a cockpit of an aircraft, the method comprising: controlling a background image on the screen in the cockpit to be displayed at a first mean luminance, and subsequently controlling at least two zones of the background image to be displayed at a non-zero second mean luminance that is less than the first mean luminance while controlling a remainder of the background image to be displayed at the first mean luminance, the at least two zones of the background image being determined independently of the background image, the at least two zones being separate and independent from each other; and wherein at least one predetermined pixel of a pattern is switched off in each occurrence of the pattern that is repeated to form the background image at least throughout the at least two zones.

2. The method according to claim 1, wherein in the at least two zones, the display of at least one sign is controlled to be distinct from the background image.

3. The method according to claim 1, wherein the pattern comprises four pixels arranged in a square, and two pixels situated in two opposite corners of the square are controlled to be left switched off.

4. A device for controlling display of an image on a screen of a cockpit of an aircraft, the device configured to: control a background image on the screen in the cockpit to be displayed at a first mean luminance, and subsequently control at least two zones of the background image to be displayed at a non-zero second mean luminance that is less than the first mean luminance while controlling a remainder of the background image to be displayed at the first mean luminance, the at least two zones of the background image being determined independently of the background image, the at least two zones being separate and independent from each other; and wherein at least one predetermined pixel of a pattern is switched off in each occurrence of the pattern that is repeated to form the background image at least throughout the at least two zones.

5. The device according to claim 4, further comprising at least one graphic memory having the following graphics layers:

a layer forming the background image;

an intermediate layer suitable for attenuating a mean luminance of the background image at least in the at least two zones; and a layer forming at least one sign.

6. A method of displaying an image on a screen of a cockpit of an aircraft, the method comprising: controlling the display of a background image on the screen such that at least in two zones that are determined independently of the background image, the background image is controlled to be at a non-zero mean luminance that is less than a mean luminance of a remainder of the background image, the two zones being separate and independent from each other; and wherein at least one predetermined pixel of a pattern is switched off in each occurrence of the pattern that is repeated to form the background image at least throughout the at least two zones.

7. A device for controlling display of an image on a screen of a cockpit of an aircraft, the device configured to control the display of a background image on the screen such that at least in two zones that are determined independently of the background image, the background image is controlled to be at a non-zero mean luminance that is less than a mean luminance of a remainder of the background image, the two zones being separate and independent from each other.

8. An image displayed on a screen of a cockpit of an aircraft, the displayed image comprising a background image wherein at least two zones that are determined independently from the background image is controlled such that the at least two zones of the background image has a noe-zero mean luminance that is less than the a mean luminance of a remainder of the background image, the at least two zones being separate and independent from each other; and wherein at least one predetermined pixel of a pattern is switched off in each occurrence of the pattern that is repeated to form the background image at least throughout the at least two zones.

9. A computer program stored in a non-transitory computer readable medium, the program including code instructions suitable for controlling execution of the method according to claim 1 when executed by a computer.

10. A computer program stored in a non-transitory computer readable medium, the program including code instructions suitable for controlling execution of the method according to claim 6 when executed by a computer.

\* \* \* \* \*